(12) United States Patent
He et al.

(10) Patent No.: US 12,452,207 B2
(45) Date of Patent: Oct. 21, 2025

(54) METHODS, APPARATUS, AND ARTICLES OF MANUFACTURE TO ADDRESS DEVICES COUPLED TO A NETWORK BUS

(71) Applicant: Texas Instruments Incorporated, Dallas, TX (US)

(72) Inventors: Shuai He, Xi'an (CN); Chao Gao, Shanghai (CN); Kangcheng Xu, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/511,674

(22) Filed: Nov. 16, 2023

(65) Prior Publication Data

US 2025/0168144 A1    May 22, 2025

(51) Int. Cl.
| | | |
|---|---|---|
| *G06F 15/16* | (2006.01) | |
| *G06F 9/54* | (2006.01) | |
| *H04L 12/40* | (2006.01) | |
| *H04L 29/06* | (2006.01) | |
| *H04L 61/5038* | (2022.01) | |

(52) U.S. Cl.
CPC .... *H04L 61/5038* (2022.05); *H04L 12/40169* (2013.01); *H04L 2012/40234* (2013.01)

(58) Field of Classification Search
CPC ........... H04L 61/5038; H04L 12/40169; H04L 2012/40234
USPC ........................................................ 709/245
See application file for complete search history.

(56) References Cited

U.S. PATENT DOCUMENTS

| | | | |
|---|---|---|---|
| 5,831,546 A * | 11/1998 | Costa ................... | G08B 25/018 307/41 |
| 7,091,876 B2 | 8/2006 | Steger | |
| 7,590,140 B2 * | 9/2009 | Hartzsch ................. | G06F 13/36 710/305 |
| 10,594,510 B1 * | 3/2020 | Arbuckle ............ | H04L 61/5038 |
| 2003/0023777 A1 * | 1/2003 | Fields ................. | H04L 61/5038 710/3 |

(Continued)

FOREIGN PATENT DOCUMENTS

EP    1490772 B1    6/2005

OTHER PUBLICATIONS

Wikipedia, "Local Interconnect Network," Wikipedia Foundation, Inc., [https://en.wikipedia.org/w/index.php?title=Local_Interconnect_Network&oldid=1154883839] retrieved on Oct. 18, 2023, 11 pages.

(Continued)

*Primary Examiner* — Hamza N Algibhah
(74) *Attorney, Agent, or Firm* — Carl G. Peterson; Frank D. Cimino

(57) ABSTRACT

An example apparatus includes a counter, an analog-to-digital converter, communication circuitry, and control circuitry configurable. The example analog-to-digital converter is configurable to sample a first voltage at a first node on a bus. The example communication circuitry is configurable to set a second node on the bus to a second voltage. Additionally, the example control circuitry is configurable to increment the counter when the first voltage does not satisfy a threshold value and, when the first voltage satisfies the threshold value, assign an address for the device based on a value of the counter.

20 Claims, 7 Drawing Sheets

(56) References Cited

U.S. PATENT DOCUMENTS

| | | | | |
|---|---|---|---|---|
| 2005/0132109 | A1* | 6/2005 | Steger | H04L 12/403 710/9 |
| 2009/0144471 | A1* | 6/2009 | Lin | G06F 13/4252 710/110 |
| 2012/0020401 | A1* | 1/2012 | Itou | H04L 12/40019 375/224 |
| 2012/0066356 | A1* | 3/2012 | Nguyen | H04L 61/5092 709/220 |
| 2017/0357582 | A1* | 12/2017 | Decloedt | G05B 19/0423 |
| 2019/0166089 | A1* | 5/2019 | Schmitz | H04L 12/40169 |
| 2019/0173838 | A1* | 6/2019 | Schmitz | H04L 12/40019 |
| 2020/0176976 | A1* | 6/2020 | Lewandowski | G06F 13/40 |
| 2023/0101025 | A1* | 3/2023 | Jung | G09G 3/32 345/55 |
| 2023/0322401 | A1* | 10/2023 | Sreenivasan | F02C 9/46 |
| 2024/0179119 | A1* | 5/2024 | Hazani | H04L 12/10 |
| 2025/0037955 | A1* | 1/2025 | Sudhaus | H02H 7/261 |

OTHER PUBLICATIONS

Wikipedia, "Open collector," Wikipedia Foundation, Inc., [https://en.wikipedia.org/w/index.php?title=Open_collector&oldid=1177442311] retrieved on Nov. 13, 2023, 7 pages.

Wikipedia, "Vehicle bus," Wikipedia Foundation, Inc., [https://en.wikipedia.org/w/index.php?title=Vehicle_bus&oldid=1139891868] retrieved on Oct. 18, 2023, 6 pages.

NXP Semiconductors, "LIN Stack Package: For Aug. 16, 2032 bit MCU User's Guide", Rev2.5.7, Jan. 2017, 92 pages.

NXP Semiconductors, "UJA1018: LIN system basis chip with LED drivers", Rev. 1, Jul. 10, 2012, 27 pages.

LIN Consortium, "LIN Extra Wire Daisy Chain Slave Node Position Detection", Rev. 1.0, Dec. 10, 2008, 16 pages.

LIN Consortium, "LIN Switch Slave Node Position Detection", Rev. 1.0, Jul. 24, 2012, 15 pages.

Gopalan, Anand et al., "Automatic Slave Node Position Detection (SNPD)", Application Report, SLDA038, Jun. 2015, 4 pages.

* cited by examiner

METHODS, APPARATUS, AND ARTICLES OF MANUFACTURE TO ADDRESS DEVICES COUPLED TO A NETWORK BUS

TECHNICAL FIELD

This description relates generally to networking and, more particularly, to methods, apparatus, and articles of manufacture to address devices coupled to a network bus.

BACKGROUND

Vehicles (e.g., automotive vehicles, manufacturing vehicles, etc.) often include electronic devices to aid in the operation of respective components of the vehicles. For example, a vehicle may include an engine control unit (ECU) to aid in the operation of an engine, a transmission control unit (TCU) to aid in the operation of a transmission, an anti-lock braking system (ABS) to aid in the operation of brakes, and/or a body control module (BCM) to aid in the operation of components in the body of the vehicle (e.g., power windows, power mirrors, air conditioning, an immobilizer system, a central locking system, etc.), among others. Electronic devices in a vehicle communicate over a specialized internal communications network (e.g., a vehicle network) that interconnects electronic devices of the vehicle via a vehicle bus. The vehicle bus may be implemented in accordance with a variety of communication protocols such as the controller area network (CAN) protocol or the local interconnect network (LIN) protocol, among others.

SUMMARY

For methods, apparatus, and articles of manufacture to address devices coupled to a network bus, an example apparatus includes a counter, an analog-to-digital converter, communication circuitry, and control circuitry configurable. The example analog-to-digital converter is configurable to sample a first voltage at a first node on a bus. The example communication circuitry is configurable to set a second node on the bus to a second voltage. Additionally, the example control circuitry is configurable to increment the counter when the first voltage does not satisfy a threshold value and, when the first voltage satisfies the threshold value, assign an address for the device based on a value of the counter.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
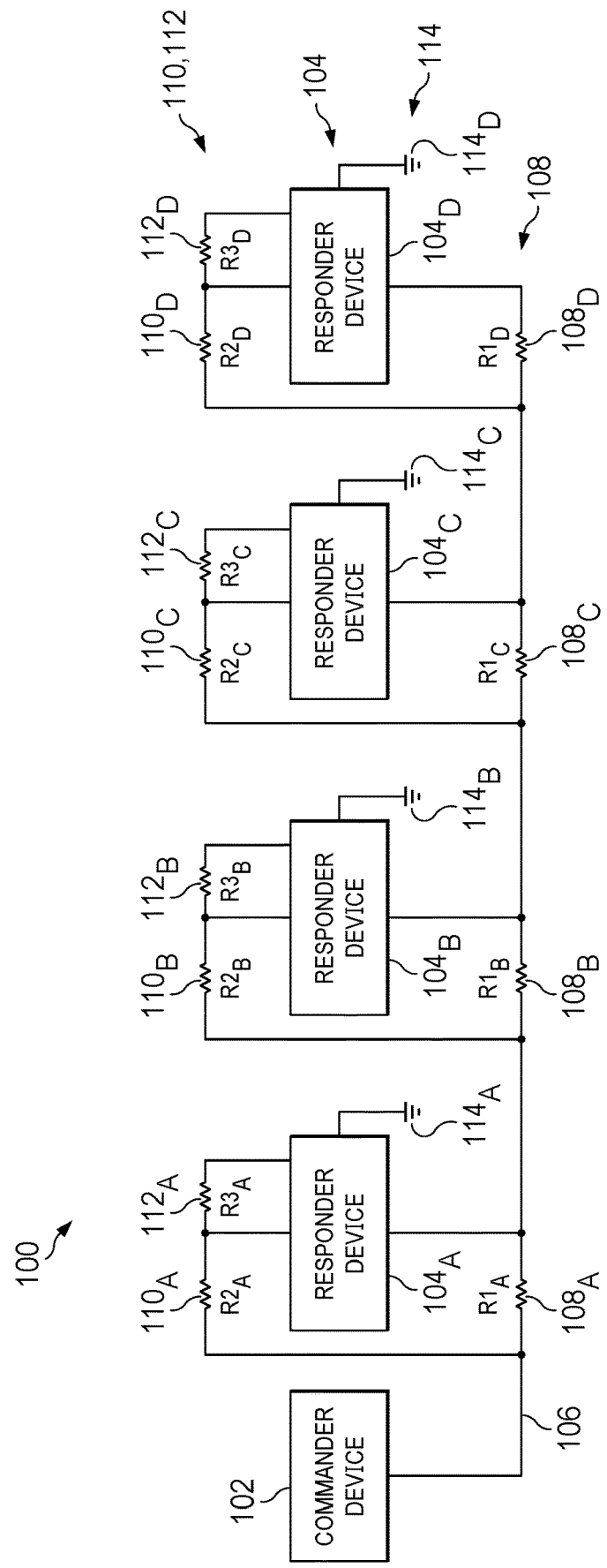
FIG. 1 is a block diagram of an example environment in which an example commander device communicates with example responder devices via an example bus.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Example vehicle buses are implemented in accordance with a communication protocol. Example communication protocols include the CAN protocol and the LIN protocol. A communication network that is implemented in accordance with a particular communication protocol may be referred to by the communication protocol. Likewise, a bus implemented in accordance with a particular communication protocol may be referred to by the communication protocol. For example, a communication network and a bus implemented in accordance with the LIN protocol may be referred to as a LIN network and a LIN bus.

The LIN protocol is a serial network protocol. An example LIN bus may be implemented as a single wire that supports communications up to 19.2 kilobits per second (Kbits/s) over a bus length of up to 40 meters. In some examples, a LIN network is a broadcast serial network that includes up to 16 devices. For example, a LIN network includes a commander device and up to 15 responder devices.

In example operation of a LIN network, messages are initiated by the commander device with one responder device replying to a given message identifier or responder device address. The commander device can also act as a responder device by replying to its own messages. Because communications are initiated by the commander device, some LIN networks do not implement a message collision detection mechanism. An example commander device and/or an example responder device may be implemented as a microcontroller, an Application Specific Integrated Circuit (ASIC), and/or other circuitry.

As described above, a commander device of a LIN network may communicate with a responder device of the LIN network via a message addressed to a responder device address. In some LIN networks, responder devices utilize hardware and/or software to deploy different addresses to the responder devices. For example, a responder device utilizes hardware and/or software that is unique to a manufacturer, a developer, and/or a seller of the responder device to deploy an address to the responder device. As such, when multiple responder devices are utilized in a LIN network, multiple different hardware and/or software implementations may be used to provide addresses to the responder devices.

Accordingly, maintenance of a LIN network may include maintenance of a variety of hardware and/or software implementations utilized to provide addresses to responder devices. As such, it may be difficult and/or monetarily expensive to maintain LIN networks using a variety of responder devices at least due to the variety of hardware and/or software implementations utilized to provide addresses to the responder devices. Examples described herein include an automated technique to assign an address to a responder device. Disclosed methods, apparatus, and articles of manufacture described herein assign an address to a responder device based on time and/or location with respect to a commander device. For example, responder devices utilize the same hardware and/or software implementation and when the responder devices are enabled (e.g., turned on), the responder devices enter a configuration mode of operation in which each responder device identifies a distance between the responder device and a commander device (e.g., which may be determined as a function of time) and then assigns an address to the responder device based on the distance (and/or time).

FIG. 1 is a block diagram of an example environment 100 in which an example commander device 102 communicates with example responder devices 104 via an example bus 106. For example, the environment 100 includes an example first responder device $104_A$, an example second responder device $104_B$, an example third responder device $104_C$, and an example fourth responder device $104_D$. In the example of FIG. 1, the bus 106 is implemented in accordance with the LIN protocol. As such, the bus 106 may be referred to as a LIN bus.

In the example of FIG. 1, the bus 106 includes an example first resistor $108_A$ (e.g., $R1_A$) corresponding to the first responder device $104_A$ and an example first resistor $108_B$ (e.g., $R1_B$) corresponding to the second responder device $104_B$. Additionally, the bus 106 includes an example first resistor $108_C$ (e.g., $R1_C$) corresponding to the third responder device $104_C$ and an example first resistor $108_D$ (e.g., $R1_D$) corresponding to the fourth responder device $104_D$. In the example of FIG. 1, respective responder devices 104 are coupled to example second resistors 110, example third resistors 112, and example ground terminals 114.

In the illustrated example of FIG. 1, the commander device 102 includes an input and/or output (I/O) terminal. The example I/O terminal of the commander device 102 is coupled to the bus 106 at a first terminal of the first resistor $108_A$ (e.g., $R1_A$). Additionally, the example I/O terminal of the commander device 102 is coupled to a first terminal of an example second resistor $110_A$ corresponding to the first responder device $104_A$. In the example of FIG. 1, the commander device 102 includes example communication circuitry and example controller circuitry. In example operation, the commander device 102 sets (e.g., holds) the bus 106 to a first voltage (e.g., a high voltage such as 12 volts (V)).

In the illustrated example of FIG. 1, the first responder device $104_A$ includes a first terminal, a second terminal, a third terminal, and a fourth terminal. In the example of FIG. 1, the first terminal of the first responder device $104_A$ is coupled to the bus 106 at a second terminal of the first resistor $108_A$ (e.g., $R1_A$) and a first terminal of the first resistor $108_B$ (e.g., $R1_B$). Additionally, the first terminal of the first responder device $104_A$ is coupled to a first terminal of an example second resistor $110_B$ (e.g., $R2_B$) corresponding to the second responder device $104_B$. In the example of FIG. 1, the second terminal of the first responder device $104_A$ is coupled to a second terminal of the second resistor $110_A$ (e.g., $R2_A$) and a first terminal of an example third resistor $112_A$ (e.g., $R3_A$) corresponding to the first responder device $104_A$.

In the illustrated example of FIG. 1, the third terminal of the first responder device $104_A$ is coupled to a second terminal of the third resistor $112_A$ (e.g., $R3_A$). In the example of FIG. 1, the fourth terminal of the first responder device $104_A$ is coupled to an example first ground terminal $114_A$. The example first responder device $104_A$ includes example communication circuitry, example controller circuitry, example sampling circuitry, example counter circuitry, and example oscillator circuitry. When enabled (e.g., turned on), the first responder device $104_A$ enters a configuration mode of operation which is described further herein.

In the illustrated example of FIG. 1, the second responder device $104_B$ includes a first terminal, a second terminal, a third terminal, and a fourth terminal. In the example of FIG. 1, the first terminal of the second responder device $104_B$ is coupled to the bus 106 at a second terminal of the first resistor $108_B$ (e.g., $R1_B$) and a first terminal of the first resistor $108_C$ (e.g., $R1_C$). Additionally, the first terminal of the second responder device $104_B$ is coupled to a first terminal of an example second resistor $110_C$ (e.g., $R2_C$) corresponding to the third responder device $104_C$. In the example of FIG. 1, the second terminal of the second responder device $104_B$ is coupled to a second terminal of the second resistor $110_B$ (e.g., $R2_B$) and a first terminal of an example third resistor $112_B$ (e.g., $R3_B$) corresponding to the second responder device $104_B$.

In the illustrated example of FIG. 1, the third terminal of the second responder device $104_B$ is coupled to a second terminal of the third resistor $112_B$ (e.g., $R3_B$). In the example of FIG. 1, the fourth terminal of the second responder device $104_B$ is coupled to an example second ground terminal 114B. The example second responder device $104_B$ includes example communication circuitry, example controller circuitry, example sampling circuitry, example counter circuitry, and example oscillator circuitry. When enabled (e.g., turned on), the second responder device $104_B$ enters a configuration mode of operation which is described further herein.

In the illustrated example of FIG. 1, the third responder device $104_C$ includes a first terminal, a second terminal, a third terminal, and a fourth terminal. In the example of FIG. 1, the first terminal of the third responder device $104_C$ is coupled to the bus 106 at a second terminal of the first resistor $108_C$ (e.g., $R1_C$) and a first terminal of the first resistor $108_D$ (e.g., $R1_D$). Additionally, the first terminal of the third responder device $104_C$ is coupled to a first terminal of an example second resistor $110_D$ (e.g., $R2_D$) corresponding to the fourth responder device $104_D$. In the example of FIG. 1, the second terminal of the third responder device $104_C$ is coupled to a second terminal of the second resistor $110_C$ (e.g., $R2_C$) and a first terminal of an example third resistor $112_C$ (e.g., $R3_C$) corresponding to the third responder device $104_C$.

In the illustrated example of FIG. 1, the third terminal of the third responder device $104_C$ is coupled to a second terminal of the third resistor $112_C$ (e.g., $R3_C$). In the example of FIG. 1, the fourth terminal of the third responder device $104_C$ is coupled to an example third ground terminal $114_C$. The example third responder device $104_C$ includes example communication circuitry, example controller circuitry, example sampling circuitry, example counter circuitry, and example oscillator circuitry. When enabled (e.g., turned on), the third responder device 104$_C$ enters a configuration mode of operation which is described further herein.

In the illustrated example of FIG. 1, the fourth responder device 104$_D$ includes a first terminal, a second terminal, a third terminal, and a fourth terminal. In the example of FIG. 1, the first terminal of the fourth responder device 104$_D$ is coupled to the bus 106 at a second terminal of the first resistor 108$_D$ (e.g., R1$_D$). In the example of FIG. 1, the second terminal of the fourth responder device 104$_D$ is coupled to a second terminal of the second resistor 110$_D$ (e.g., R2$_D$) and a first terminal of an example third resistor 112$_D$ (e.g., R3$_D$) corresponding to the fourth responder device 104$_D$.

In the illustrated example of FIG. 1, the third terminal of the fourth responder device 104$_D$ is coupled to a second terminal of the third resistor 112$_D$ (e.g., R3$_D$). In the example of FIG. 1, the fourth terminal of the fourth responder device 104$_D$ is coupled to an example fourth ground terminal 114$_D$. The example fourth responder device 104$_D$ includes example communication circuitry, example controller circuitry, example sampling circuitry, example counter circuitry, and example oscillator circuitry. When enabled (e.g., turned on), the fourth responder device 104$_D$ enters a configuration mode of operation which is described further herein.

As described above, some of the responder devices 104 may be more physically proximate to the commander device 102 than others of the responder devices 104. For example, in the example of FIG. 1, the first responder device 104$_A$ is more physically proximate to the commander device 102 than the second responder device 104$_B$, the third responder device 104$_C$, and the fourth responder device 104$_D$. Additionally, in the example of FIG. 1, the second responder device 104$_B$ is more physically proximate to the commander device 102 than the third responder device 104$_C$ and the fourth responder device 104$_D$. In the example of FIG. 1, the third responder device 104$_C$ is more physically proximate to the commander device 102 than the fourth responder device 104$_D$.

In the example configuration mode of operation (sometimes referred to as a configuration mode), each of the responder devices 104 assigns an address to itself based on respective distances of the responder devices 104 along the bus 106 with respect to the commander device 102. For example, during a first iteration of the configuration mode, the first responder device 104$_A$ monitors the voltage at the first terminal of the first resistor 108$_A$ (e.g., R1$_A$) by sampling the voltage via a voltage divider including the second resistor 110$_A$ and the third resistor 112$_A$. During the first iteration of the configuration mode, the first responder device 104$_A$ sets the voltage at the second terminal of the first resistor 108$_A$ to a second voltage (e.g., a low voltage such as 0 V). Additionally, during the first iteration of the configuration mode, the second responder device 104$_B$ monitors the voltage at the first terminal of the first resistor 108$_B$ (e.g., R1$_B$) by sampling the voltage via a voltage divider including the second resistor 110$_B$ and the third resistor 112$_B$. During the first iteration of the configuration mode, the second responder device 104$_B$ sets the voltage at the second terminal of the first resistor 108$_B$ to a second voltage (e.g., a low voltage such as 0 V).

As such, during the first iteration of the configuration mode, the first responder device 104$_A$ samples the first voltage (e.g., 12 V) at the first terminal of the first resistor 108$_A$ (e.g., R1$_A$) via the voltage divider including the second resistor 110$_A$ and the third resistor 112$_A$. Additionally, during the first iteration of the configuration mode, the second responder device 104$_B$ samples the second voltage (e.g., 0 V) at the first terminal of the first resistor 108$_B$ (e.g., R1$_B$) via the voltage divider including the second resistor 110$_B$ and the third resistor 112$_B$. Each of the responder devices 104 compares the sampled voltage to a preset threshold value. Because the voltage at the first terminal of the first resistor 108$_B$ is the second voltage (e.g., 0 V), the voltage sampled by the second responder device 104$_B$ (e.g., 0 V) does not satisfy the preset threshold value.

Conversely, because the voltage at the first terminal of the first resistor 108$_A$ is set to the first voltage (e.g., 12 V), the voltage sampled by the first responder device 104$_A$ is non-zero and may satisfy the preset threshold value. If the voltage sampled by the first responder device 104$_A$ satisfies (e.g., exceeds) the preset threshold value, the first responder device 104$_A$ assigns an address to the first responder device 104$_A$ based on a counter and/or timer maintained by the first responder device 104$_A$. In examples described herein, each of the responder devices 104 increments a counter and/or timer per iteration of the configuration mode.

During a second iteration of the configuration mode, the first responder device 104$_A$ sets the voltage at the second terminal of the first resistor 108$_A$ to the first voltage (e.g., a high voltage such as 12 V). Additionally, during the second iteration of the configuration mode, the second responder device 104$_B$ monitors the voltage at the first terminal of the first resistor 108$_B$ (e.g., R1$_B$) by sampling the voltage via the voltage divider including the second resistor 110$_B$ and the third resistor 112$_B$. During the second iteration of the configuration mode, the second responder device 104$_B$ sets the voltage at the second terminal of the first resistor 108$_B$ to the second voltage (e.g., a low voltage such as 0 V).

As such, during the second iteration of the configuration mode, the second responder device 104$_B$ samples the first voltage (e.g., 12 V) at the first terminal of the first resistor 108$_B$ (e.g., R1$_B$) via the voltage divider including the second resistor 110$_B$ and the third resistor 112$_B$. The second responder devices 104$_B$ compares the sampled voltage to the preset threshold value. Because the voltage at the first terminal of the first resistor 108$_B$ is the first voltage (e.g., 12 V), the voltage sampled by the second responder device 104$_B$ is non-zero and may satisfy the preset threshold value. If the voltage sampled by the second responder device 104$_B$ satisfies (e.g., exceeds) the preset threshold value, the second responder device 104$_B$ assigns an address to the second responder device 104$_B$ based on a counter and/or timer maintained by the second responder device 104$_B$. As described above, responder devices that are physically closer to the commander device 102 on the bus 106 assign respective addresses to themselves before devices that are physically farther from the commander device 102. Accordingly, the responder devices 104 assign respective addresses to themselves in a cascading order based on a distance (e.g., a position) of the responder devices 104 on the bus 106 with respect to the commander device 102.

In accordance with the techniques of this disclosure, the first responder device 104$_A$ assigns itself an address value when the commander device 102 sets the voltage on the bus 106. The first responder device 104$_A$ then sets the voltage on the bus 106 for the next responder device (e.g., the second responder device 104$_B$). In a cascading manner, each of the responder devices 104 assigns itself an address value after the previous responder device or the commander device 102 sets the voltage on the bus 106. Described techniques may be simpler to implement than other solutions, allowing for responder devices made by different manufacturers to function autonomously using only the voltage on the bus 106 as an input. Described techniques can be implemented in hardware, software, and/or firmware. In addition, described techniques can be preprogrammed or prebuilt on each of the responder devices 104 and/or programmed onto a responder device after manufacturing and assembly.

Figure 2:
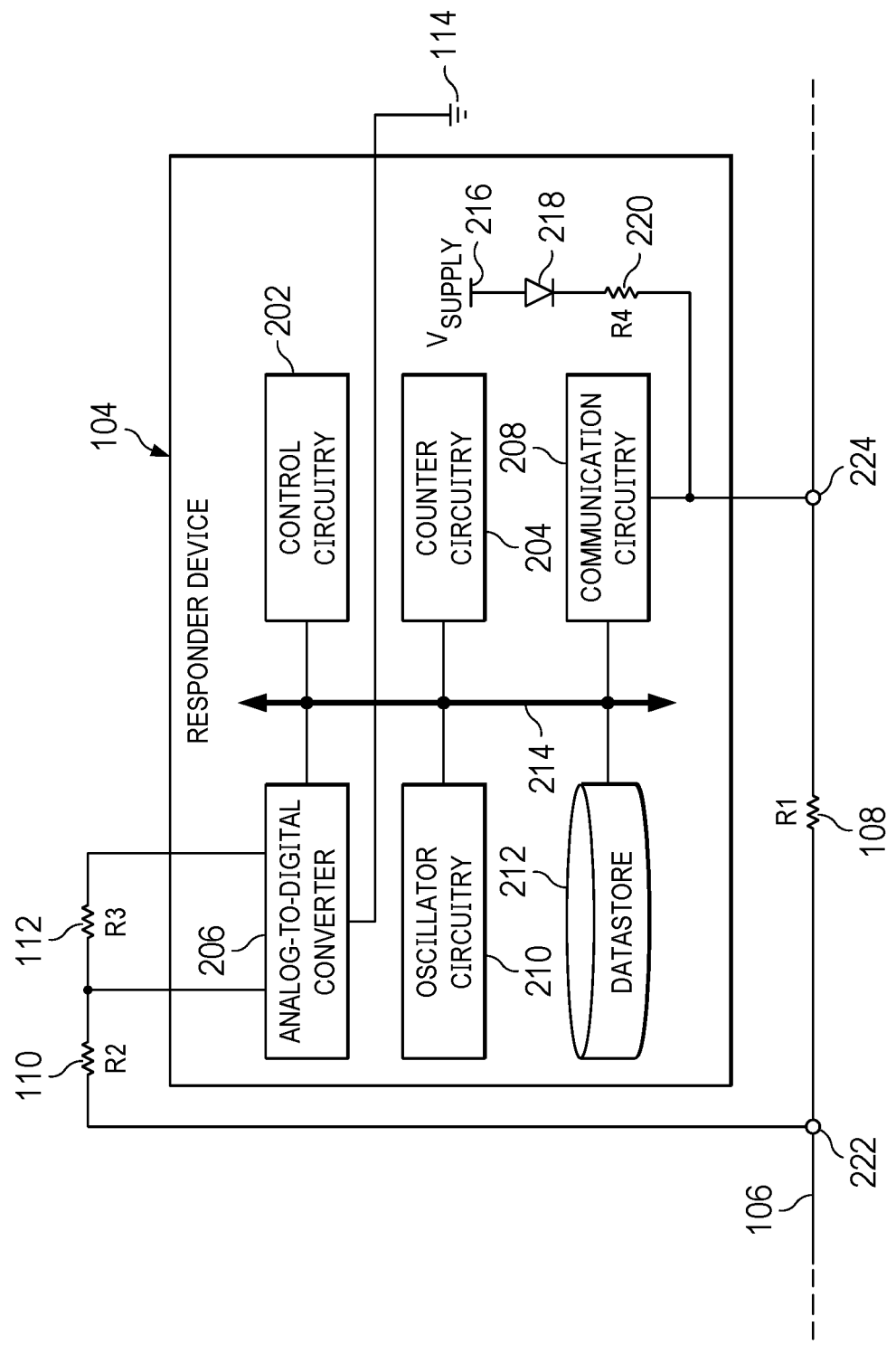
FIG. 2 is a block diagram of an example implementation of one or more of the responder devices of FIG. 1.

FIG. 2 is a block diagram of an example implementation of one or more of the responder devices 104 of FIG. 1. In the example of FIG. 2, the example implementation of one or more of the responder devices 104 includes example control circuitry 202, example counter circuitry 204, an example analog-to-digital converter (ADC) 206, example communication circuitry 208, example oscillator circuitry 210, and an example datastore 212. In the example of FIG. 2, the example implementation of one or more of the responder devices 104 also includes an example voltage supply 216 (e.g., $V_{SUPPLY}$), an example diode 218, and an example fourth resistor 220 (e.g., R4). In examples described herein, the commander device 102 includes similar circuitry (an example voltage supply, an example diode, and an example pullup resistor) to establish the voltage (e.g., 12 V) on the bus 106.

In the illustrated example of FIG. 2, the control circuitry 202, the counter circuitry 204, the ADC 206, the communication circuitry 208, the oscillator circuitry 210, and the datastore 212 are coupled via an example internal bus 214. For example, the internal bus 214 may be implemented using any suitable wired and/or wireless communication. In additional or alternative examples, the internal bus 214 includes software, machine-readable instructions, and/or communication protocols by which information is communicated among the control circuitry 202, the counter circuitry 204, the ADC 206, the communication circuitry 208, the oscillator circuitry 210, and the datastore 212.

In the illustrated example of FIG. 2, the bus 106 includes an example first node 222 at a first terminal of the first resistor 108 (e.g., R1) and an example second node 224 at a second terminal of the first resistor 108 (e.g., R1). In the example of FIG. 2, the resistance of the first resistor 108 (e.g., R1) is one kiloohm (KΩ). Additionally, in the example of FIG. 2, a first terminal of the control circuitry 202 is coupled to the internal bus 214. Additionally, a first terminal of the counter circuitry 204 is coupled to the internal bus 214. In the example of FIG. 2, a first terminal of the ADC 206 is coupled to the internal bus 214. Additionally, a second terminal of the ADC 206 is coupled to a second terminal of the second resistor 110 (e.g., R2) and a first terminal of the third resistor 112 (e.g., R3). In the example of FIG. 2, a first terminal of the second resistor 110 (e.g., R2) is coupled to the bus 106 at the first node 222. In the example of FIG. 2, the resistance of the second resistor 110 (e.g., R2) is 10 KΩ. Additionally, a third terminal of the ADC 206 is coupled to a second terminal of the third resistor 112 (e.g., R3). In the example of FIG. 2, the resistance of the third resistor 112 (e.g., R1) is two KΩ. Additionally, in the example of FIG. 2, a fourth terminal of the ADC 206 is coupled to the ground terminal 114.

In the illustrated example of FIG. 2, a first terminal of the communication circuitry 208 is coupled to the bus 106 and a second terminal of the fourth resistor 220 (e.g., R4) at the second node 224. Additionally, a second terminal of the communication circuitry 208 is coupled to the internal bus 214. In the example of FIG. 2, a first terminal of the oscillator circuitry 210 is coupled to the internal bus 214. Additionally, a first terminal of the datastore 212 is coupled to the internal bus 214. In the example of FIG. 2, a first terminal of the diode 218 is coupled to the voltage supply 216 (e.g., $V_{SUPPLY}$). Additionally, a second terminal of the diode 218 is coupled to a first terminal of the fourth resistor 220 (e.g., R4).

In the illustrated example of FIG. 2, one or more of the example control circuitry 202, the example counter circuitry 204, the example ADC 206, the example communication circuitry 208, the example oscillator circuitry 210, or the example datastore 212 may be instantiated (e.g., creating an instance of, bring into being for any length of time, materialize, implement, etc.) by programmable circuitry such as a Central Processor Unit (CPU) executing first instructions. Additionally or alternatively, in the example of FIG. 2, one or more of the example control circuitry 202, the example counter circuitry 204, the example ADC 206, the example communication circuitry 208, the example oscillator circuitry 210, or the example datastore 212 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

Figure 5:
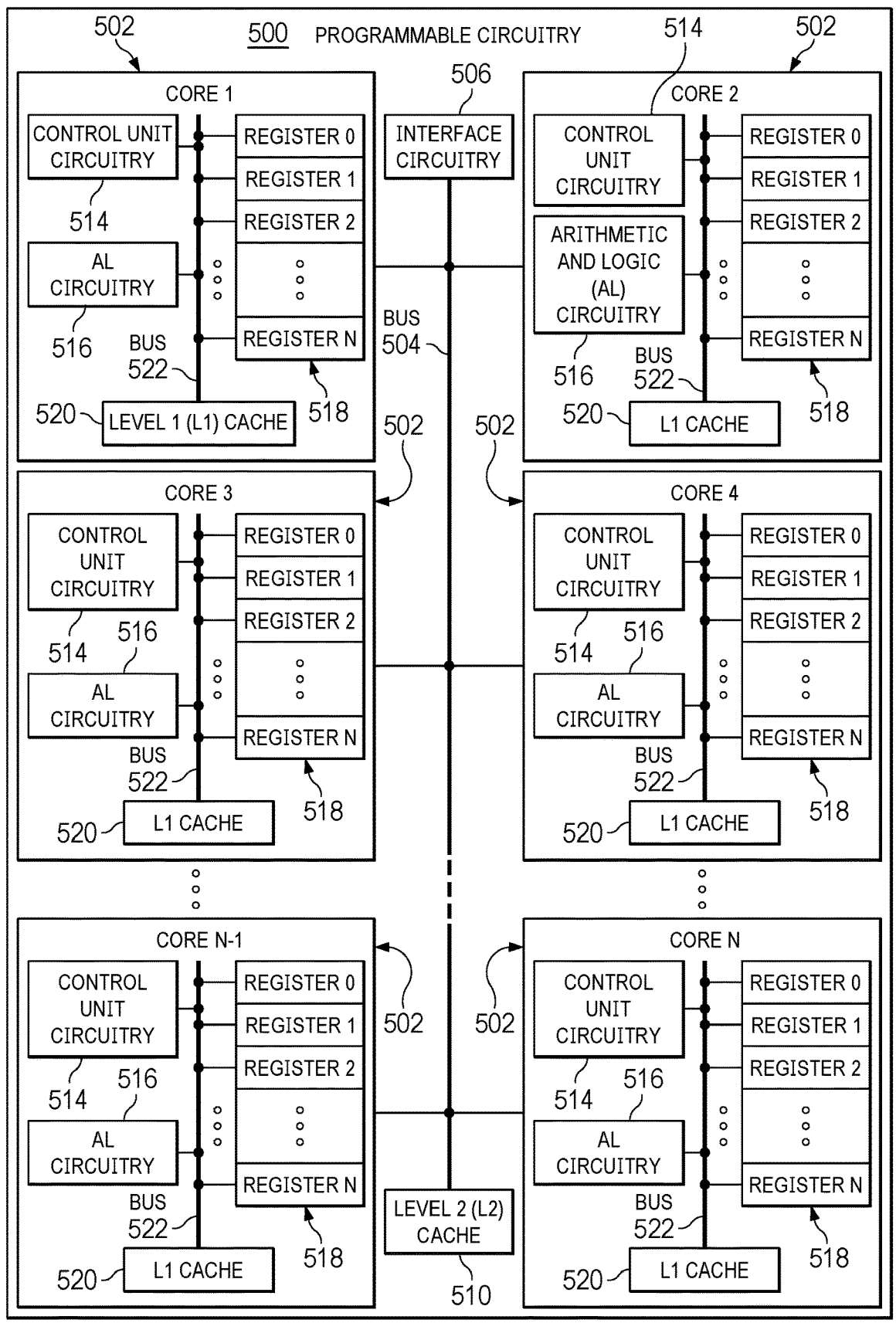
FIG. 5 is a block diagram of an example implementation of the programmable circuitry of FIG. 4.

In the illustrated example of FIG. 2, the control circuitry 202 is implemented by a microcontroller such as the microprocessor 500 of FIG. 5. Additionally or alternatively, the control circuitry 202 is implemented by an ASIC and/or an FPGA such as the FPGA circuitry 600 of FIG. 6. In some examples, the control circuitry 202 is instantiated by programmable circuitry executing control instructions and/or configured to perform operations such as those represented by the flowchart of FIG. 3. In the example of FIG. 2, the control circuitry 202 controls the example implementation of one or more of the responder devices 104 of FIG. 2. For example, the control circuitry 202 controls the example implementation of one or more of the responder devices 104 during the configuration mode of operation and/or one or more post-configuration modes of operation.

In some examples, the example implementation of one or more of the responder devices 104 includes means for controlling. For example, the means for controlling may be implemented by the control circuitry 202. In some examples, the control circuitry 202 may be instantiated by programmable circuitry such as the example programmable circuitry 412 of FIG. 4. For example, the control circuitry 202 may be instantiated by the example microprocessor 500 of FIG. 5 executing machine-executable instructions such as those implemented by at least blocks 302, 310, 312, 314, 316, 318, 322, and 324 of FIG. 3. In some examples, the control circuitry 202 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the control circuitry 202 may be instantiated by any other combination of hardware, software, and/or firmware. For example, the control circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the counter circuitry 204 is implemented by two or more flip-flops coupled in a cascade. For example, the counter circuitry 204 may be implemented as an asynchronous counter (e.g., a ripple counter) or a synchronous counter (e.g., a decade counter, a ring counter, a Johnson counter, etc.). In some examples, the counter circuitry 204 is implemented by a timer or timer circuitry. In such examples, the control circuitry 202 may be configured to assign an address based on the time value stored in the timer circuitry. In some examples, the counter circuitry 204 is instantiated by programmable circuitry executing counter instructions and/or timer instructions and/or configured to perform operations such as those represented by the flowchart of FIG. 3. In the example of FIG. 2, the counter circuitry 204 maintains a count to track a number of iterations of the configuration mode of operation. For example, as described below, the count indicates a number of iterations of the configuration mode of operation that have transpired before the control circuitry 202 assigns an address to the implementation of one or more of the responder devices 104 (e.g., the communication circuitry 208).

In some examples, the example implementation of one or more of the responder devices 104 includes means for counting and/or means for timing. For example, the means for counting and/or the means for timing may be implemented by the counter circuitry 204. In some examples, the counter circuitry 204 may be instantiated by programmable circuitry such as the example programmable circuitry 412 of FIG. 4. For example, the counter circuitry 204 may be instantiated by the example microprocessor 500 of FIG. 5 executing machine-executable instructions. In some examples, the counter circuitry 204 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the counter circuitry 204 may be instantiated by any other combination of hardware, software, and/or firmware. For example, the counter circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the ADC 206 is implemented by a microcontroller such as the microprocessor 500 of FIG. 5. Additionally or alternatively, the ADC 206 is implemented by an ASIC and/or an FPGA such as the FPGA circuitry 600 of FIG. 6. In some examples, the ADC 206 is instantiated by programmable circuitry executing sampling instructions and/or configured to perform operations such as those represented by the flowchart of FIG. 3. In the example of FIG. 2, the ADC 206 includes a transistor. Additionally, in the example of FIG. 2, the ADC 206 samples the voltage at the first node 222 on the bus 106 over a sampling period via a voltage divider including the second resistor 110 and the third resistor 112. For example, to sample the voltage at the first node 222, the ADC 206 couples the third resistor 112 (e.g., R3) to the ground terminal 114, thereby creating the voltage divider. In the example of FIG. 2, the transistor of the ADC 206 is implemented by a metal-oxide-semiconductor field-effect transistor (MOSFET). As such, when sampling the voltage at the first node 222, the ADC 206 connects a drain of the MOSFET to the third resistor 112 (e.g., R3) and the source of the MOSFET to the ground terminal 114.

In some examples, the example implementation of one or more of the responder devices 104 includes means for sampling. For example, the means for sampling may be implemented by ADC circuitry such as the ADC 206. In some examples, the ADC 206 may be instantiated by programmable circuitry such as the example programmable circuitry 412 of FIG. 4. For example, the ADC 206 may be instantiated by the example microprocessor 500 of FIG. 5 executing machine-executable instructions such as those implemented by at least blocks 304 and 308 of FIG. 3. In some examples, the ADC 206 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the ADC 206 may be instantiated by any other combination of hardware, software, and/or firmware. For example, the ADC 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the communication circuitry 208 is implemented by a transmitter, a receiver, and/or a transceiver. In some examples, the communication circuitry 208 is implemented by a microcontroller such as the microprocessor 500 of FIG. 5. Additionally or alternatively, the communication circuitry 208 is implemented by an ASIC and/or an FPGA such as the FPGA circuitry 600 of FIG. 6. In some examples, the communication circuitry 208 is instantiated by programmable circuitry executing communication instructions and/or configured to perform operations such as those represented by the flowchart of FIG. 3. In the example of FIG. 2, the communication circuitry 208 controls the voltage at the second node 224. For example, before the control circuitry 202 assigns an address to the example implementation of one or more of the responder devices 104, the communication circuitry 208 sets the second node 224 to the second voltage (e.g., a low voltage such as 0 V). Additionally, after the control circuitry 202 assigns an address to the example implementation of one or more of the responder devices 104, the communication circuitry 208 sets the second node 224 to the first voltage (e.g., a high voltage such as 12 V) via the voltage supply 216 (e.g., $V_{SUPPLY}$), the diode 218, and the fourth resistor 220 (e.g., R4).

In some examples, the example implementation of one or more of the responder devices 104 includes means for communicating. For example, the means for communicating may be implemented by the communication circuitry 208. In some examples, the communication circuitry 208 may be instantiated by programmable circuitry such as the example programmable circuitry 412 of FIG. 4. For example, the communication circuitry 208 may be instantiated by the example microprocessor 500 of FIG. 5 executing machine-executable instructions such as those implemented by at least blocks 306 and 320 of FIG. 3. In some examples, the communication circuitry 208 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the communication circuitry 208 may be instantiated by any other combination of hardware, software, and/or firmware. For example, the communication circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the oscillator circuitry 210 is implemented a resistor capacitor (RC) oscillator. For example, the oscillator circuitry 210 may be implemented by a phase-shift oscillator, a twin-T oscillator, a quadrature oscillator, and/or a Wien bridge oscillator, among others. In additional or alternative examples, the oscillator circuitry 210 may be implemented by a crystal oscillator. In some examples, the oscillator circuitry 210 is instantiated by programmable circuitry executing clock instructions and/or configured to perform operations such as those represented by the flowchart of FIG. 3. In the example of FIG. 2, the oscillator circuitry 210 maintains a clock for the example implementation of one or more of the responder devices 104.

In some examples, the example implementation of one or more of the responder devices 104 includes means for clocking. For example, the means for clocking may be implemented by the oscillator circuitry 210. In some examples, the oscillator circuitry 210 may be instantiated by programmable circuitry such as the example programmable circuitry 412 of FIG. 4. For instance, the oscillator circuitry 210 may be instantiated by the example microprocessor 500 of FIG. 5 executing machine-executable instructions. In some examples, the oscillator circuitry 210 may be instantiated by hardware logic circuitry, which may be implemented by an ASIC, XPU, or the FPGA circuitry 600 of FIG. 6 configured and/or structured to perform operations corresponding to the machine-readable instructions. Additionally or alternatively, the oscillator circuitry 210 may be instantiated by any other combination of hardware, software, and/or firmware. For example, the oscillator circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the datastore 212 includes data associated with the configuration mode of operation. For example, the datastore 212 includes data indicative of a threshold value to be used to determine whether to assign an address to the example implementation of one or more of the responder devices 104, data indicative of a number of responder devices in the LIN network of the environment 100 of FIG. 1, data indicative of one or more candidate addresses for the example implementation of one or more of the responder devices 104, and/or data indicative of a mapping between a count of the counter circuitry 204 and the one or more candidate addresses (e.g., a lookup table (LUT)). The example datastore 212 also includes data indicative of a length of a sampling period for the ADC 206 and/or data indicative of a length of time to be used when determining a remaining amount of an addressing period of the configuration mode of operation.

In the illustrated example of FIG. 2, the datastore 212 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 212 may additionally or alternatively be implemented by one or more double data rate (DDR) memories, such as DDR, DDR2, DDR3, DDR4, DDR5, mobile DDR (mDDR), DDR SDRAM, etc. The datastore 212 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the datastore 212 is illustrated as a single datastore, the datastore 212 may be implemented by any number and/or type(s) of datastores. Furthermore, the data stored in the datastore 212 may be in any data format such as, for example, binary data, comma delimited data, tab delimited data, structured query language (SQL) structures, etc.

In example operation, during the configuration mode of operation, the control circuitry 202 initializes the counter circuitry 204. For example, the control circuitry 202 initializes the counter circuitry 204 at a value of one. As described above, in some examples, the counter circuitry 204 may be implemented by a timer (e.g., timer circuitry). During the configuration mode of operation, the ADC 206 waits for the first node 222 on the bus 106 to stabilize at the first voltage (e.g., 12 V). For example, the ADC 206 waits 50 milliseconds (ms) for the first node 222 to stabilize at the first voltage. Additionally, during the configuration mode of operation, the communication circuitry 208 sets the second node 224 on the bus 106 to the second voltage (e.g., 0 V).

In example operation, during the configuration mode of operation, after the ADC 206 has waited for the first node 222 to stabilize at the first voltage, the ADC 206 samples the first voltage at the first node 222 on the bus 106 over a sampling period. In the example of FIG. 2, the sampling period utilized by the ADC 206 is set to a value to allow the voltage being sampled to be stable. For example, the ADC 206 samples the first voltage at the first node 222 for a sampling period of 100 ms. During the configuration mode of operation, the control circuitry 202 computes an average value of the first voltage sampled from the first node 222 and determines whether the average value of the voltage satisfies (e.g., is greater than or equal to) a threshold value.

As described above, the commander device 102 and each of the responder devices 104 include a voltage supply, a diode, and a pullup resistor (e.g., R4). As such, when communication circuitry 208 sets the second node 224 to the second voltage (e.g., 0 V) during the sampling period, the pullup resistor (e.g., R4) of the preceding device in the LIN network and the first resistor 108 (e.g., R1) of the responder device determining the threshold value form a voltage divider. As such, the threshold value is determined based on the voltage divider including the pullup resistor (e.g., R4) of the preceding device in the LIN network and the first resistor 108 (e.g., R1) of the responder device determining the threshold value. For example, the threshold value is computed according to Equation 1 below.

$$V_{THRESHOLD} = \frac{R_1}{R_4 + R_1} * (V_{SUPPLY} - V_D) \quad \text{Equation 1}$$

In the example of Equation 1, $V_{THRESHOLD}$ is indicative of the threshold voltage value. For example, to determine whether a responder device is eligible to be assigned an address, the control circuitry 202 determines whether the voltage at the first node 222 satisfies (e.g., is greater than or equal to) the bus voltage (e.g., 12 V). As such, when the voltage at the first node 222 is set to the bus voltage (either by the commander device 102 or another responder device), the voltage sampled by the ADC 206 will satisfy (e.g., be equal to or exceed) the threshold voltage value.

In the example of Equation 1, $R_1$ is indicative of the resistance of the first resistor 108 (e.g., R1) and $R_4$ is indicative of the resistance of the fourth resistor 220 (e.g., R4) of a preceding device in the LIN network. Additionally, $V_{SUPPLY}$ is indicative of the voltage of the voltage supply 216 (e.g., $V_{SUPPLY}$) of the preceding device in the LIN network and $V_D$ is indicative of the voltage drop across the diode 218 of the preceding device in the LIN network. In the example of FIG. 2, the threshold voltage value (e.g., $V_{THRESHOLD}$) is equal to 1.027 V (e.g., $$\frac{1,000}{10,000 + 1,000} * (12 - 0.7) = \frac{1}{11} * 11.3 = 1.027).$$

In the illustrated example of FIG. 2, during the configuration mode of operation, if the control circuitry 202 determines that the average value of the first voltage at the first node 222 satisfies (e.g., is greater than or equal to) the threshold value (e.g., $V_{THRESHOLD}$) (e.g., the average value is $V_O$), the control circuitry 202 assigns an address to the implementation of one or more of the responder devices 104 (e.g., the communication circuitry 208) based on the value of a counter maintained by the counter circuitry 204. For example, the value of the counter may be mapped to an address for the implementation of one or more of the responder devices 104 via a LUT. As such, the control circuitry 202 may determine an address to assign to the implementation of one or more of the responder devices 104 by looking up the address in a LUT based on the value of the counter maintained by the counter circuitry 204.

In the illustrated example of FIG. 2, during the configuration mode of operation, if the control circuitry 202 determines that the average value of the first voltage at the first node 222 satisfies (e.g., is greater than or equal to) the threshold value (e.g., $V_{THRESHOLD}$), the control circuitry 202 increments the counter maintained by the counter circuitry 204. Thus, the control circuitry 202 increments the counter circuitry 204 to track iterations of the configuration mode of operation. As described above, responder devices that are physically closer to the commander device 102 on the bus 106 assign respective addresses to themselves before devices that are physically farther from the commander device 102. As such, the value of the counter maintained by the counter circuitry 204 is indicative of a distance of a responder device from the commander device 102. Accordingly, the control circuitry 202 assigns an address to the example implementation of one or more of the responder devices 104 based on a distance of the example implementation of one or more of the responder devices 104 from the commander device 102.

In the illustrated example of FIG. 2, during the configuration mode of operation, after the control circuitry 202 assigns an address to the example implementation of one or more of the responder devices 104, the communication circuitry 208 sets the second node 224 to the first voltage (e.g., a high voltage such as 12 V) via the voltage supply 216 (e.g., $V_{SUPPLY}$), the diode 218, and the fourth resistor 220 (e.g., R4). As such, the communication circuitry 208 allows subsequent responder devices in the LIN network to assign themselves addresses. For example, Table 1 illustrates multiple iterations of the configuration mode of operation.

TABLE 1

| | Voltage at the I/O terminal of 102 | Voltage at the first terminal of $104_A$ | Voltage at the first terminal of $104_B$ | Voltage at the first terminal of $104_C$ | Voltage at the first terminal of $104_D$ | Voltage at the first terminal of $108_A$ | Voltage at the first terminal of $108_B$ | Voltage at the first terminal of $108_C$ | Voltage at the first terminal of $108_D$ |
|---|---|---|---|---|---|---|---|---|---|
| Iteration 1 | H | L | L | L | L | $V_O$ | 0 | 0 | 0 |
| Iteration 2 | H | H | L | L | L | $V_{SUPPLY}$ | $V_O$ | 0 | 0 |
| Iteration 3 | H | H | H | L | L | $V_{SUPPLY}$ | $V_{SUPPLY}$ | $V_O$ | 0 |
| Iteration 4 | H | H | H | H | L | $V_{SUPPLY}$ | $V_{SUPPLY}$ | $V_{SUPPLY}$ | $V_O$ |
| Iteration 5 | H | H | H | H | H | $V_{SUPPLY}$ | $V_{SUPPLY}$ | $V_{SUPPLY}$ | $V_{SUPPLY}$ |

In the example of Table 1, with reference to FIG. 1, during a first iteration of the configuration mode, the commander device 102 sets the voltage at the I/O terminal of the commander device 102 to high voltage (e.g., 12 V). Additionally, during the first iteration of the configuration mode as illustrated in Table 1, each of the responder devices 104 set the voltage at the respective first terminals of the responder devices 104 to a low voltage (e.g., 0 V). As such, only the voltage sampled at the first terminal of the first resistor $108_A$ satisfies the threshold voltage value (e.g., is $V_O$) whereas the voltage sampled at the first terminals of the first resistor $108_B$, the first resistor $108_C$, and the first resistor $108_D$ is zero volts. As such, only the first responder device $104_A$ assigns itself and address during the first iteration of the configuration mode.

In the example of Table 1, with reference to FIG. 1, during a second iteration of the configuration mode, the commander device 102 sets the voltage at the I/O terminal of the commander device 102 to high voltage (e.g., 12 V). Similarly, during the second iteration of the configuration mode as illustrated in Table 1, the first responder device $104_A$ sets the voltage at the first terminal of the first responder device $104_A$ to a high voltage (e.g., 12 V). Additionally, during the second iteration of the configuration mode as illustrated in Table 1, each of the second responder device $104_B$, the third responder device $104_C$, and the fourth responder device $104_D$ set the voltage at the respective first terminals of the second responder device $104_B$, the third responder device $104_C$, and the fourth responder device $104_D$ to a low voltage (e.g., 0 V). Thus, the first terminal of the first resistor $108_A$ is at the supply voltage (e.g., $V_{SUPPLY}$). As such, only the voltage sampled at the first terminal of the first resistor $108_B$ satisfies the threshold voltage value (e.g., is $V_O$) whereas the voltage sampled at the first terminals of the first resistor $108_C$ and the first resistor $108_D$ is zero volts. As such, only the second responder device $104_B$ assigns itself and address during the second iteration of the configuration mode.

In the example of Table 1, with reference to FIG. 1, during a third iteration of the configuration mode, the commander device 102 sets the voltage at the I/O terminal of the commander device 102 to high voltage (e.g., 12 V). Similarly, during the third iteration of the configuration mode as illustrated in Table 1, each of the first responder device $104_A$ and the second responder device $104_B$ set the voltage at respective first terminals of the first responder device $104_A$ and the second responder device $104_B$ to a high voltage (e.g., 12 V). Additionally, during the third iteration of the configuration mode as illustrated in Table 1, each of the third responder device $104_C$ and the fourth responder device $104_D$ set the voltage at the respective first terminals of the third responder device $104_C$ and the fourth responder device $104_D$ to a low voltage (e.g., 0 V). Thus, the first terminals of the first resistor $108_A$ and the first resistor $108_B$ are at the supply voltage (e.g., $V_{SUPPLY}$). As such, only the voltage sampled at the first terminal of the first resistor $108_C$ satisfies the threshold voltage value (e.g., is $V_O$) whereas the voltage sampled at the first terminal of the first resistor $108_D$ is zero volts. As such, only the third responder device $104_C$ assigns itself and address during the third iteration of the configuration mode.

In the example of Table 1, with reference to FIG. 1, during a fourth iteration of the configuration mode, the commander device 102 sets the voltage at the I/O terminal of the commander device 102 to high voltage (e.g., 12 V). Similarly, during the fourth iteration of the configuration mode as illustrated in Table 1, each of the first responder device $104_A$, the second responder device $104_B$, and the third responder device $104_C$ set the voltage at respective first terminals of the first responder device $104_A$, the second responder device $104_B$, and the third responder device $104_C$ to a high voltage (e.g., 12 V). Additionally, during the fourth iteration of the configuration mode as illustrated in Table 1, the fourth responder device $104_D$ sets the voltage at the first terminal of the fourth responder device $104_D$ to a low voltage (e.g., 0 V). Thus, the first terminals of the first resistor $108_A$, the first resistor $108_B$, and the first resistor $108_C$ are at the supply voltage (e.g., $V_{SUPPLY}$). As such, only the voltage sampled at the first terminal of the first resistor $108_D$ satisfies the threshold voltage value (e.g., is $V_O$). As such, only the fourth responder device $104_D$ assigns itself and address during the fourth iteration of the configuration mode.

While an example manner of implementing one or more of the responder devices 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example control circuitry 202, the example counter circuitry 204, the example ADC 206, the example communication circuitry 208, the example oscillator circuitry 210, the example datastore 212, and/or, more generally, one or more of the example responder devices 104 of FIG. 2, may be implemented by hardware alone or by hardware in combination with software and/or firmware. Thus, for example, any of the example control circuitry 202, the example counter circuitry 204, the example ADC 206, the example communication circuitry 208, the example oscillator circuitry 210, the example datastore 212, and/or, more generally, one or more of the example responder devices 104, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, one or more of the example responder devices 104 of FIG. 2 may include one or more elements, processes, and/or devices in addition to, or instead of, those illustrated in FIG. 2, and/or may include more than one of any or all of the illustrated elements, processes, and devices.

Figure 3:
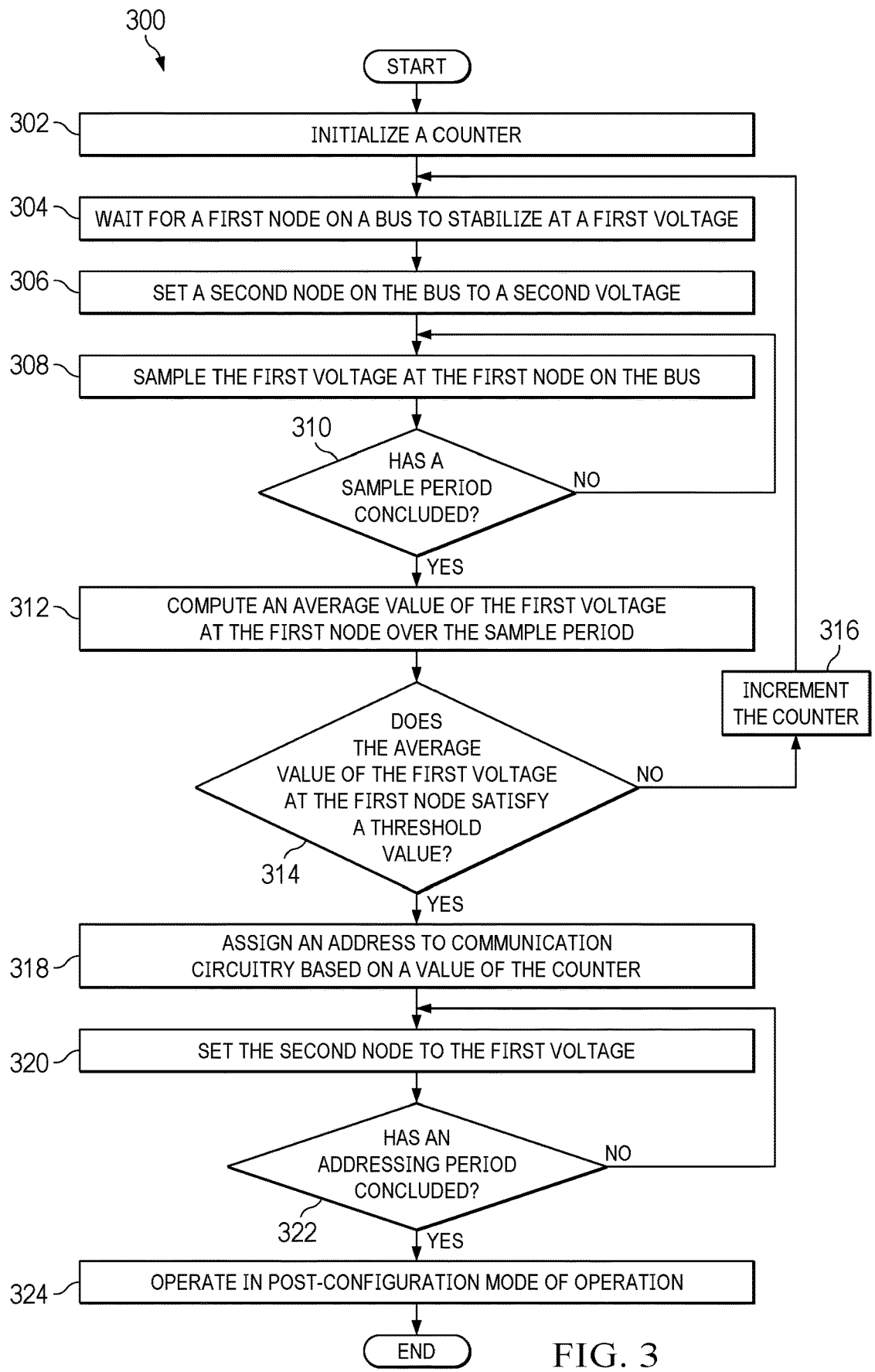
FIG. 3 is a flowchart representative of example machine-readable instructions and/or example operations that may be executed, instantiated, and/or performed using an example programmable circuitry implementation of one or more of the responder devices of FIG. 2.

A flowchart representative of example machine-readable instructions, which may be executed by programmable circuitry to implement and/or instantiate one or more of the responder devices 104 of FIG. 2 and/or representative of example operations which may be performed by programmable circuitry (e.g., instructions to cause programmable circuitry) to implement and/or instantiate one or more of the responder devices 104 of FIG. 2, are shown in FIG. 3. The machine-readable instructions may be one or more executable programs or portion(s) of one or more executable programs for execution by programmable circuitry such as the programmable circuitry 412 shown in the example programmable circuitry platform 400 described below in connection with FIG. 4 and/or may be one or more function(s) or portion(s) of functions to be performed by the example programmable circuitry (e.g., an FPGA) described below in connection with FIGS. 5 and/or 6. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart illustrated in FIG. 3, many other methods of implementing one or more of the example responder devices 104 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine-executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine-executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 3 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine-readable instructions and/or example operations 300 that may be executed, instantiated, and/or performed using an example programmable circuitry implementation of one or more of the responder devices 104 of FIG. 2. The example machine-readable instructions and/or the example operations 300 of FIG. 3 begin at block 302, at which the control circuitry 202 initializes a counter maintained by the counter circuitry 204. For example, the control circuitry 202 initializes the counter at a value of zero or one. The control circuitry 202 may be configured to initialize the counter circuitry 204 on startup (e.g., in response to the responder device 104 being powered on). For example, the control circuitry 202 can initialize the counter circuitry 204 in response to receiving power at a supply node (e.g., a VDD rail).

In the illustrated example of FIG. 3, at block 304, the ADC 206 waits for a first node on a bus to stabilize at a first voltage. For example, the ADC 206 waits for the first node 222 on the bus 106 to stabilize at a high value (e.g., 12 V). Additionally, for example, the ADC 206 waits 100 ms for the first node 222 on the bus 106 to stabilize at the high value (e.g., 12 V). At block 306, the communication circuitry 208 sets a second node on the bus to a second voltage (e.g., the machine-readable instructions and/or the operations 300 cause communication circuitry to set a second node on the bus to a second voltage). For example, the communication circuitry 208 sets the second node 224 on the bus 106 to a low value (e.g., 0 V). At block 308, the ADC 206 samples the first voltage at the first node on the bus. For example, the ADC 206 samples the first voltage at the first node 222 on the bus 106.

In the illustrated example of FIG. 3, at block 310, the control circuitry 202 determines whether a sampling period has concluded (e.g., expired). For example, the sampling period is 100 ms. Based on (e.g., in response to) the control circuitry 202 determining that the sampling period has not concluded (block 310: NO), the machine-readable instructions and/or the operations 300 return to block 308. Based on (e.g., in response to) the control circuitry 202 determining that the sampling period has concluded (block 310: YES), the machine-readable instructions and/or the operations 300 proceed to block 312.

In the illustrated example of FIG. 3, at block 312, the control circuitry 202 computes an average value of the first voltage at the first node over the sampling period. At block 314, the control circuitry 202 determines whether the average value of the first voltage at the first node satisfies a threshold value. Based on (e.g., in response to) the control circuitry 202 determining that the average value of the first voltage at the first node does not satisfy the threshold value (block 314: NO), the machine-readable instructions and/or the operations 300 proceed to block 316. At block 316, the control circuitry 202 increments the counter maintained by the counter circuitry 204. Based on (e.g., in response to) the control circuitry 202 determining that the average value of the first voltage at the first node does satisfies the threshold value (block 314: YES), the machine-readable instructions and/or the operations 300 proceed to block 318.

In the illustrated example of FIG. 3, at block 318, the control circuitry 202 assigns an address to communication circuitry of the example one or more of the responder devices 104 based on a value of the counter. For example, the control circuitry 202 assigns an address to the communication circuitry 208 based on Table 2 below, which may be implemented as LUT.

TABLE 2

| Counter Value | Address |
| --- | --- |
| 1 | 0 × 51 |
| 2 | 0 × 52 |
| 3 | 0 × 53 |
| 4 | 0 × 54 |

In the illustrated example of FIG. 3, at block 320, the communication circuitry 208 sets the second node to the first voltage. For example, the communication circuitry 208 sets the voltage at the second node 224 to a high value (e.g., 12 V). At block 322, the control circuitry 202 determines whether an addressing period has concluded. In examples described herein, at block 322, the remaining period of the addressing period at each of the responder devices 104 differs based on the number of responder devices remaining to be addressed. For example, the remaining period of the addressing period is based on the value of the counter maintained by the counter circuitry and the number of responder devices in the LIN network. For example, if there are four responder devices in the LIN network and at block 322, the counter value is two (having been initialized at one), the control circuitry 202 determines that two responder devices in the LIN network have self-assigned an address and two responder devices in the LIN network have yet to self-assign an address. As such, the remaining period of the addressing period can be computed based on the number of responder devices yet to self-assign an address and a delay per iteration of the configuration mode of operation. For example, the delay per iteration of the configuration mode of operation is 200 ms.

In the illustrated example of FIG. 3, based on (e.g., in response to) the control circuitry 202 determining that the addressing period has not concluded (block 322: NO), the machine-readable instructions and/or the operations 300 return to block 320. Based on (e.g., in response to) the control circuitry 202 determining that the addressing period has concluded (block 322: YES), the machine-readable instructions and/or the operations 300 proceed to block 324. At block 324, the control circuitry 202 operates in a post-configuration mode of operation.

Figure 4:
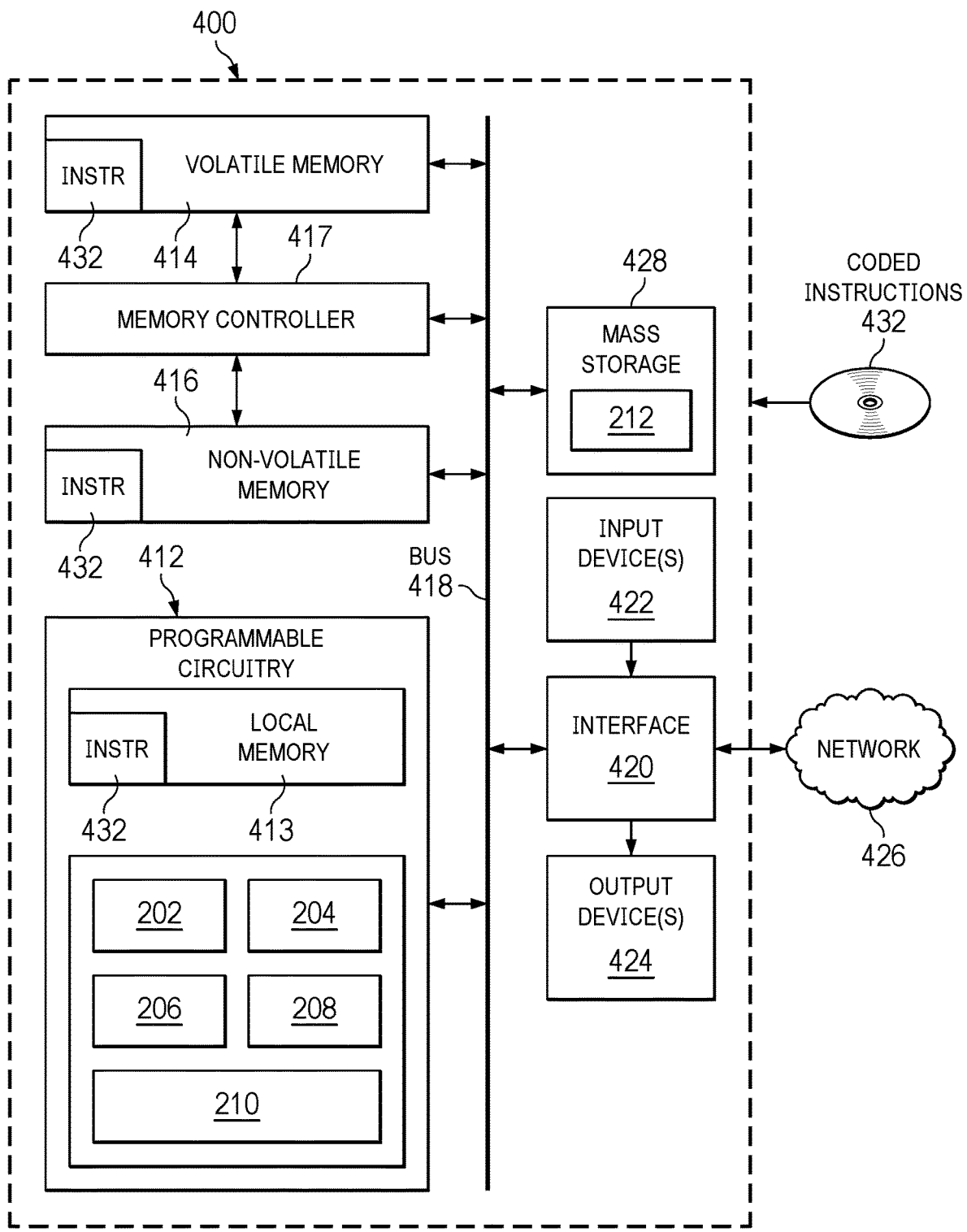
FIG. 4 is a block diagram of an example processing platform including programmable circuitry structured to execute, instantiate, and/or perform the example machine-readable instructions and/or perform the example operations of FIG. 3 to implement one or more of the responder devices of FIG. 2.

FIG. 4 is a block diagram of an example programmable circuitry platform 400 structured to execute and/or instantiate the example machine-readable instructions and/or the example operations of FIG. 3 to implement one or more of the responder devices 104 of FIG. 2. The programmable circuitry platform 400 can be, for example, a microcontroller, a semiconductor device, an integrated circuit (IC), a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 400 of the illustrated example includes programmable circuitry 412. The programmable circuitry 412 of the illustrated example is hardware. For example, the programmable circuitry 412 can be implemented by one or more integrated circuits, logic circuits, FPGAs, microprocessors, CPUs, GPUs, DSPs, and/or microcontrollers from any desired family or manufacturer. The programmable circuitry 412 may be implemented by one or more semiconductor based (e.g., silicon based) devices. In this example, the programmable circuitry 412 implements the example control circuitry 202, the example counter circuitry 204, the example ADC 206, the example communication circuitry 208, and the example oscillator circuitry 210.

The programmable circuitry 412 of the illustrated example includes a local memory 413 (e.g., a cache, registers, etc.). The programmable circuitry 412 of the illustrated example is in communication with main memory 414, 416, which includes a volatile memory 414 and a non-volatile memory 416, by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417. In some examples, the memory controller 417 may be implemented by one or more integrated circuits, logic circuits, microcontrollers from any desired family or manufacturer, or any other type of circuitry to manage the flow of data going to and from the main memory 414, 416.

The programmable circuitry platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user (e.g., a human user, a machine user, etc.) to enter data and/or commands into the programmable circuitry 412. The input device(s) 422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 400 of the illustrated example also includes one or more mass storage discs or devices 428 to store firmware, software, and/or data. In this example, the one or more mass storage discs or devices 428 implement the example datastore 212. Examples of such mass storage discs or devices 428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 432, which may be implemented by the machine-readable instructions of FIG. 3, may be stored in the mass storage device 428, in the volatile memory 414, in the non-volatile memory 416, and/or on at least one non-transitory computer-readable storage medium such as a CD or DVD which may be removable.

FIG. 5 is a block diagram of an example implementation of the programmable circuitry 412 of FIG. 4. In this example, the programmable circuitry 412 of FIG. 4 is implemented by a microprocessor 500. For example, the microprocessor 500 may be a general-purpose microprocessor (e.g., general-purpose microprocessor circuitry). The microprocessor 500 executes some or all of the machine-readable instructions of the flowchart of FIG. 3 to effectively instantiate the circuitry of FIG. 2 as logic circuits to perform operations corresponding to those machine-readable instructions. In some such examples, the circuitry of FIG. 2 is instantiated by the hardware circuits of the microprocessor 500 in combination with the machine-readable instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine-readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine-readable instructions and/or operations represented by the flowchart of FIG. 3.

The cores 502 may communicate by a first example bus 504. In some examples, the first bus 504 may be implemented by a communication bus to achieve communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer-based operations. In other examples, the AL circuitry 516 also performs floating-point operations. In yet other examples, the AL circuitry 516 may include first AL circuitry that performs integer-based operations and second AL circuitry that performs floating-point operations. In some examples, the AL circuitry 516 may be referred to as an Arithmetic Logic Unit (ALU).

The registers 518 are semiconductor-based structures to store data and/or instructions such as results of one or more of the operations performed by the AL circuitry 516 of the corresponding core 502. For example, the registers 518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure, such as by being distributed throughout the core 502 to shorten access time. The second bus 522 may be implemented by at least one of an I2C bus, a SPI bus, a PCI bus, or a PCIe bus.

Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages.

The microprocessor 500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those described herein. A GPU, DSP and/or other programmable device can also be an accelerator. Accelerators may be on-board the microprocessor 500, in the same chip package as the microprocessor 500 and/or in one or more separate packages from the microprocessor 500.

Figure 6:
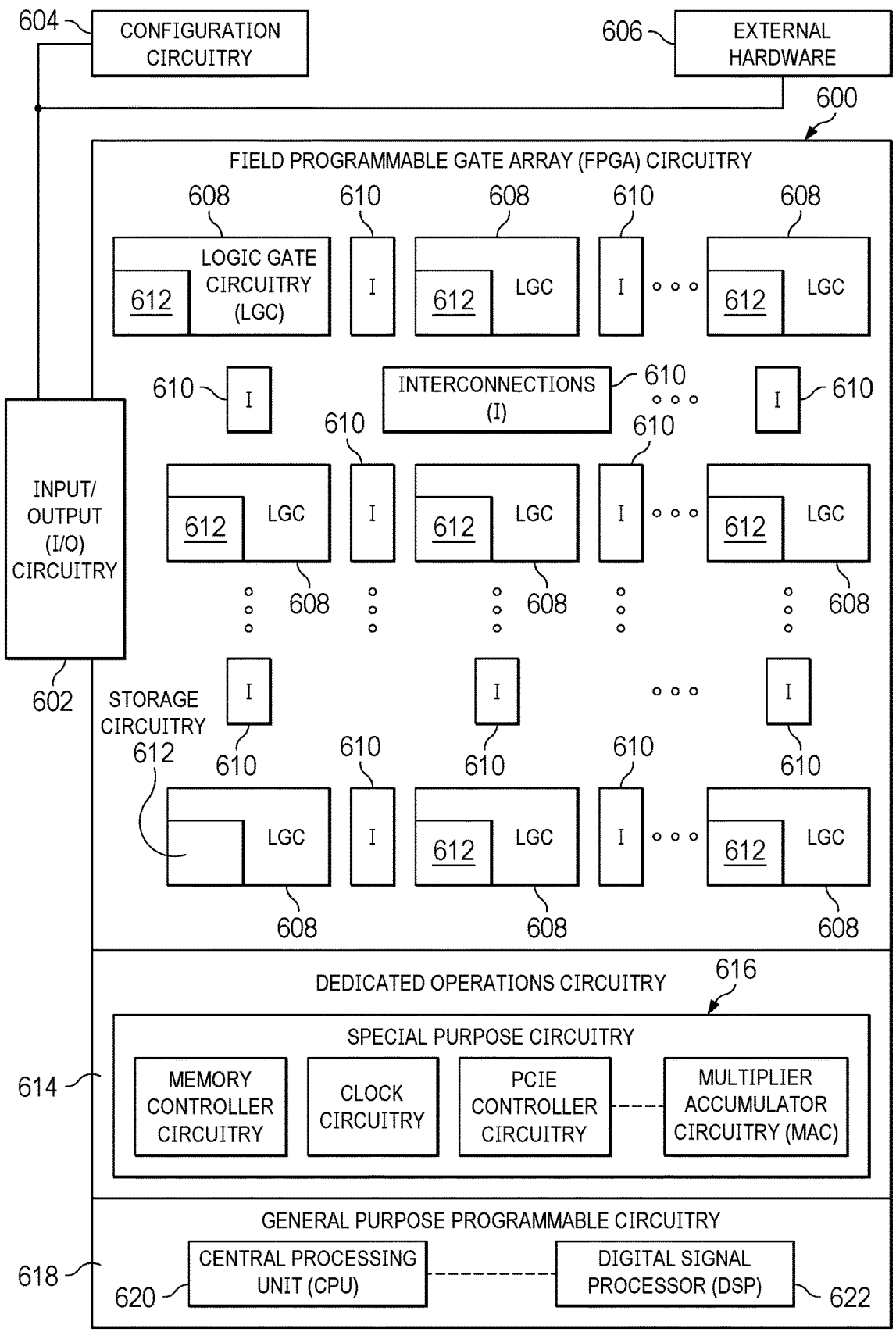
FIG. 6 is a block diagram of another example implementation of the programmable circuitry of FIG. 4.

FIG. 6 is a block diagram of another example implementation of the programmable circuitry 412 of FIG. 4. In this example, the programmable circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine-readable instructions. However, once configured, the FPGA circuitry 600 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 500 of FIG. 5 described above (which is a general purpose device that may be programmed to execute some or all of the machine-readable instructions represented by the flowchart of FIG. 3 but whose interconnections and logic circuitry are fixed once fabricated), the FPGA circuitry 600 of the example of FIG. 6 includes interconnections and logic circuitry that may be configured, structured, programmed, and/or interconnected in different ways after fabrication to instantiate, for example, some or all of the operations/functions corresponding to the machine-readable instructions represented by the flowchart of FIG. 3. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 3. As such, the FPGA circuitry 600 may be configured and/or structured to effectively instantiate some or all of the operations/functions corresponding to the machine-readable instructions of the flowchart of FIG. 3 as dedicated logic circuits to perform the operations/functions corresponding to those software instructions in a dedicated manner analogous to an ASIC. Therefore, the FPGA circuitry 600 may perform the operations/functions corresponding to the some or all of the machine-readable instructions of FIG. 3 faster than the general-purpose microprocessor can execute the same.

In the example of FIG. 6, the FPGA circuitry 600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 600 of FIG. 6 may access and/or load the binary file to cause the FPGA circuitry 600 of FIG. 6 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 600 of FIG. 6 may access and/or load the binary file to cause the FPGA circuitry 600 of FIG. 6 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

The FPGA circuitry 600 of FIG. 6, includes example input/output (I/O) circuitry 602 to obtain and/or output data to/from example configuration circuitry 604 and/or external hardware 606. For example, the configuration circuitry 604 may be implemented by interface circuitry that may obtain a binary file, which may be implemented by a bit stream, data, and/or machine-readable instructions, to configure the FPGA circuitry 600, or portion(s) thereof. In some such examples, the configuration circuitry 604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 606 may be implemented by external hardware circuitry. For example, the external hardware 606 may be implemented by the microprocessor 500 of FIG. 5.

The FPGA circuitry 600 also includes an array of example logic gate circuitry 608, a plurality of example configurable interconnections 610, and example storage circuitry 612.

The logic gate circuitry 608 and the configurable interconnections 610 are configurable to instantiate one or more operations/functions that may correspond to at least some of the machine-readable instructions of FIG. 3 and/or other desired operations. The logic gate circuitry 608 shown in FIG. 6 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations/functions. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example dedicated operations circuitry 614. In this example, the dedicated operations circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the programmable circuitry 412 of FIG. 4, many other approaches are contemplated. For example, FPGA circuitry may include an on-board CPU, such as one or more of the example CPU 620 of FIG. 5. Therefore, the programmable circuitry 412 of FIG. 4 may additionally be implemented by combining at least the example microprocessor 500 of FIG. 5 and the example FPGA circuitry 600 of FIG. 6. In some such hybrid examples, one or more cores 502 of FIG. 5 may execute a first portion of the machine-readable instructions represented by the flowchart of FIG. 3 to perform first operation(s)/function(s), the FPGA circuitry 600 of FIG. 6 may be configured and/or structured to perform second operation(s)/function(s) corresponding to a second portion of the machine-readable instructions represented by the flowchart of FIG. 3, and/or an ASIC may be configured and/or structured to perform third operation(s)/function(s) corresponding to a third portion of the machine-readable instructions represented by the flowchart of FIG. 3.

It should be understood that some or all of the circuitry of FIG. 2 may, thus, be instantiated at the same or different times. For example, same and/or different portion(s) of the microprocessor 500 of FIG. 5 may be programmed to execute portion(s) of machine-readable instructions at the same and/or different times. In some examples, same and/or different portion(s) of the FPGA circuitry 600 of FIG. 6 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 500 of FIG. 5 may execute machine-readable instructions in one or more threads executing concurrently and/or in series. In some examples, the FPGA circuitry 600 of FIG. 6 may be configured and/or structured to carry out operations/functions concurrently and/or in series. Moreover, in some examples, some or all of the circuitry of FIG. 2 may be implemented within one or more virtual machines and/or containers executing on the microprocessor 500 of FIG. 5.

In some examples, the programmable circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the programmable circuitry 412 of FIG. 4, which may be in one or more packages. For example, the XPU may include a CPU (e.g., the microprocessor 500 of FIG. 5, the CPU 620 of FIG. 6, etc.) in one package, a DSP (e.g., the DSP 622 of FIG. 6) in another package, a GPU in yet another package, and an FPGA (e.g., the FPGA circuitry 600 of FIG. 6) in still yet another package.

Figure 7:
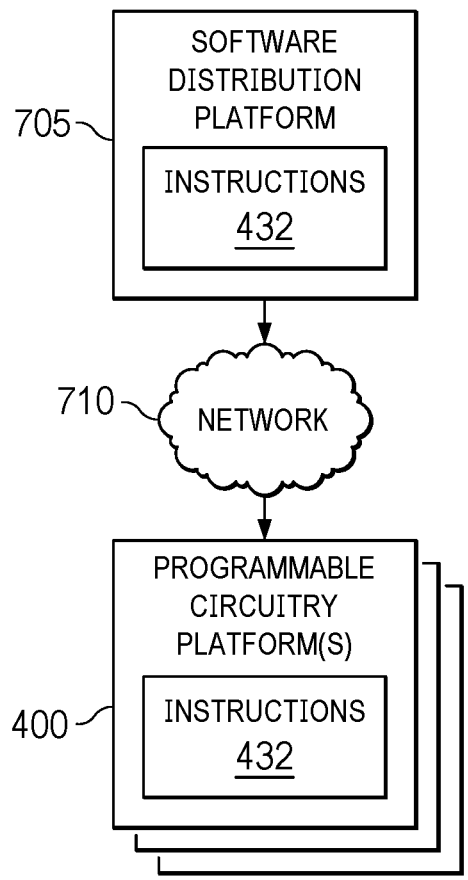
FIG. 7 is a block diagram of an example software/firmware/instructions distribution platform (e.g., one or more servers) to distribute software, instructions, and/or firmware (e.g., corresponding to the example machine-readable instructions of FIG. 3) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine-readable instructions 432 of FIG. 4 to other hardware devices (e.g., hardware devices owned and/or operated by third parties from the owner and/or operator of the software distribution platform) is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 705 may be a developer, a seller, and/or a licensor of software such as the example machine-readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine-readable instructions 432, which may correspond to the example machine-readable instructions of FIG. 3, as described above. The one or more servers of the example software distribution platform 705 are in communication with an example network 710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 432 from the software distribution platform 705. For example, the software, which may correspond to the example machine-readable instructions of FIG. 3, may be downloaded to the example programmable circuitry platform 400, which is to execute the machine-readable instructions 432 to implement one or more of the responder devices 104. In some examples, one or more servers of the software distribution platform 705 periodically offer, transmit, and/or force updates to the software (e.g., the example machine-readable instructions 432 of FIG. 4) to ensure improvements, patches, updates, etc., are distributed and applied to the software at the end user devices. Although referred to as software above, the distributed "software" could alternatively be firmware.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers, as used in the detailed description, do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "substantially" preceding a value means +/−10 percent of the stated value, or, if the value is zero, a reasonable range of values around zero.

Modifications are possible in the described embodiments, and other embodiments are possible, within the scope of the claims.

From the foregoing, it will be appreciated that example systems, apparatus, articles of manufacture, and methods have been described that reduce the difficulty to maintain LIN networks via an automated technique to assign an address to a responder device. Described systems, apparatus, articles of manufacture, and methods improve the efficiency of using a computing device by increasing the amount of time a LIN network can operate without manual intervention. For example, according to examples described herein, when a responder device is added to a LIN network, the LIN network can be assigned an address without human intervention. Described systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. A device comprising:
a counter;
an analog-to-digital converter configurable to sample a first voltage on a bus;
communication circuitry configurable to set a second voltage on the bus; and
control circuitry configurable to:
  increment the counter when the first voltage does not satisfy a threshold value; and
  when the first voltage satisfies the threshold value, assign an address for the device based on a value of the counter.

2. The device of claim 1, wherein the bus is a local interconnect network bus.

3. The device of claim 1, wherein:
the analog-to-digital converter is configurable to sample the first voltage over a sampling period; and
the control circuitry is configurable to compute an average value of the first voltage over the sampling period.

4. The device of claim 3, wherein to increment the counter, the control circuitry is configurable to increment the counter when the average value of the first voltage does not satisfy the threshold value.

5. The device of claim 1, wherein the device is a first responder device, and the control circuitry is configurable to operate in a post-configuration mode of operation after an addressing period has concluded for the first responder device and at least a second responder device, at least the second responder device in communication with a commander device over the bus.

6. The device of claim 1, wherein, when the first voltage satisfies the threshold value, the communication circuitry is configurable to set the second voltage to a voltage level of the first voltage.

7. The device of claim 6, wherein:
the communication circuitry is configurable to set the second voltage to the voltage level of the first voltage for an addressing period; and
the addressing period is based on the value of the counter and a number of responder devices in communication with a commander device over the bus.

8. The device of claim 1, wherein the control circuitry is configurable to:
determine that the first voltage does not satisfy the threshold value;
increment the counter in response to determining that the first voltage does not satisfy the threshold value;
after incrementing the counter, determine that the first voltage satisfies the threshold value; and
in response to determining that the first voltage satisfies the threshold value, assign the address for the device based on the value of the counter.

9. The device of claim 1, wherein the control circuitry is configurable to:
assign a first address for the device in response to determining that the value of the counter is a first value; and
assign a second address for the device in response to determining that the value of the counter is a second value, the second address different from the first address.

10. A non-transitory machine-readable storage medium comprising instructions to cause programmable circuitry of a device to at least:

cause an analog-to-digital converter to sample a first voltage on a bus;
cause communication circuitry to set a second voltage on the bus;
increment a counter when the first voltage does not satisfy a threshold value; and
when the first voltage satisfies the threshold value, assign an address for the device based on a value of the counter.

11. The non-transitory machine-readable storage medium of claim 10, wherein the instructions are to cause the programmable circuitry to:
determine that the first voltage does not satisfy the threshold value;
increment the counter in response to determining that the first voltage does not satisfy the threshold value;
after incrementing the counter, determine that the first voltage satisfies the threshold value; and
in response to determining that the first voltage satisfies the threshold value, assign the address for the device based on the value of the counter.

12. A system comprising:
a bus including a resistor coupled in series with the bus, the resistor including a first terminal and a second terminal;
a first responder device including a first terminal coupled to the first terminal of the resistor and a second terminal coupled to the second terminal of the resistor, wherein the first responder device is configurable to:
sample a first voltage at the first terminal of the resistor, set the second terminal of the resistor to a second voltage; and
when the first voltage satisfies a threshold value, assign an address for the first responder device based on a value of a first counter, and
a second responder device including a first terminal coupled to the second terminal of the resistor, wherein the second responder device is configurable to:
sample the second voltage at the second terminal of the resistor; and
increment a second counter when the second voltage does not satisfy the threshold value.

13. The system of claim 12, wherein the bus is a local interconnect network bus.

14. The system of claim 12, wherein the first responder device is to:
sample the first voltage over a sampling period; and
compute an average value of the first voltage over the sampling period.

15. The system of claim 14, wherein to increment the first counter, the first responder device is to increment the first counter when the average value of the first voltage does not satisfy the threshold value.

16. The system of claim 12, wherein the first responder device is to operate in a post-configuration mode of operation after an addressing period has concluded for the first responder device and the second responder device.

17. The system of claim 12, wherein, after the address is assigned for the first responder device, the first responder device is to set the second terminal to a voltage level of the first voltage.

18. The system of claim 17, further including a commander device, wherein:
the first responder device is to set the second terminal to the voltage level of the first voltage for an addressing period; and
the addressing period is based on the value of the first counter and a number of responder devices in communication with the commander device over the bus.

19. The system of claim 12, wherein the first responder device is to:
determine that the first voltage does not satisfy the threshold value;
increment the first counter in response to determining that the first voltage does not satisfy the threshold value;
after incrementing the first counter, determine that the first voltage satisfies the threshold value; and
in response to determining that the first voltage satisfies the threshold value, assign the address for the first responder device based on the value of the first counter.

20. The system of claim 12, wherein the first responder device is to:
assign a first address for the first responder device in response to determining that the value of the first counter is a first value; and
assign a second address for the first responder device in response to determining that the value of the first counter is a second value, the second address different from the first address.

* * * * *